June 7, 1927.

A. C. HOPKINS

BRAIDING CARRIER

Filed Sept. 10, 1925

1,631,634

2 Sheets-Sheet 1

Inventor:
Arthur C. Hopkins,
By Dyrenforth, Lee, Chritton & Wiles,
Attys.

June 7, 1927.　A. C. HOPKINS　1,631,634
BRAIDING CARRIER
Filed Sept. 10, 1925　2 Sheets-Sheet 2
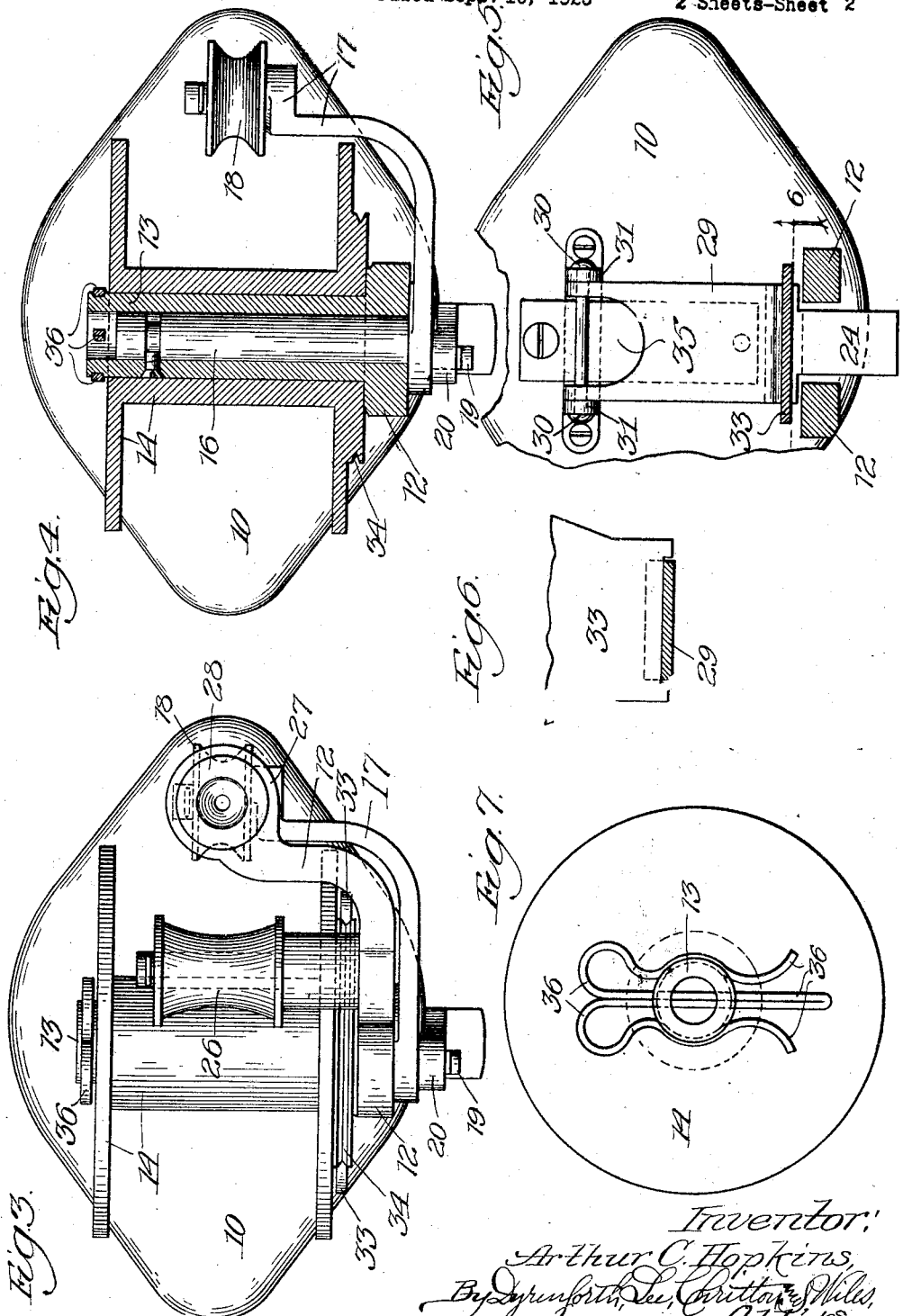

Patented June 7, 1927.

1,631,634

UNITED STATES PATENT OFFICE.

ARTHUR C. HOPKINS, OF NILES, MICHIGAN.

BRAIDING CARRIER.

Application filed September 10, 1925. Serial No. 55,467.

This invention relates to braiding carriers and the like for use on machines for braiding wire bands and the like and is fully described in the following specification and shown in the accompanying drawings, in which—

Figure 2:
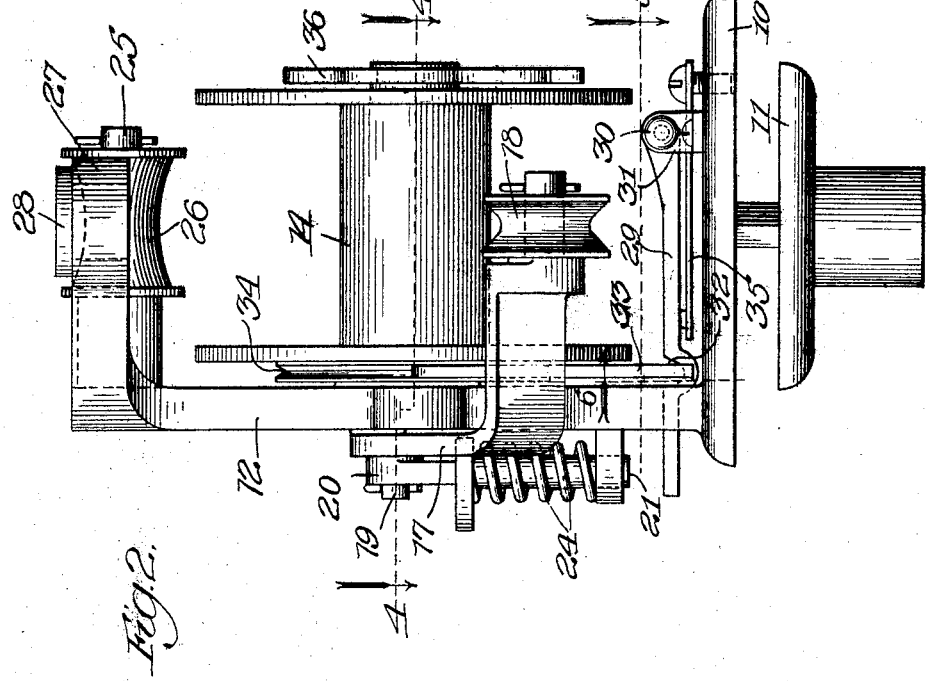
Figure 1:
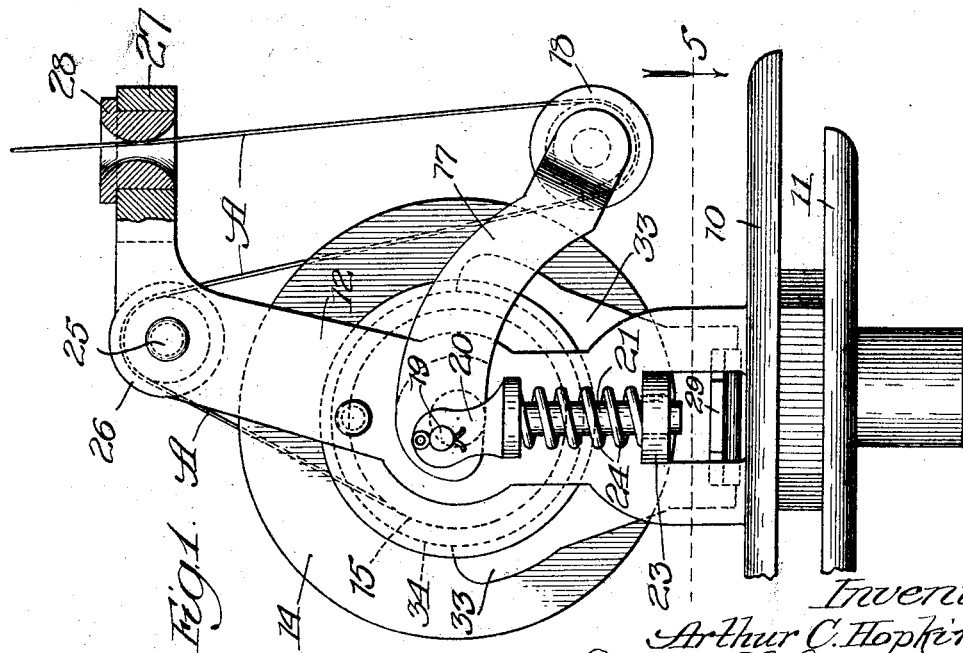

Figure 1 is a side elevation of the braiding carrier; Figure 2 is a front elevation of the same; Figure 3 is a top plan view; Figure 4 is a horizontal section on the line 4—4 of Fig. 2; Figure 5 is a partial section on the line 5 of Fig. 2; Figure 6 is a partial vertical section on the line 6 of Fig. 2, and Figure 7 is a rear elevation of the end of the spool and axle.

The embodiment illustrated comprises a braiding carrier having a base 10 with a well-known form of shoe 11. From the base rises preferably a single standard 12 from which laterally extends a hollow stub axle 13 upon which a spool 14 may be journalled. This axle is kept quite near the base 10 so that the weight of the spool 14 and the wire or the like 15 wound thereon will be kept quite near the base.

A pin 16 is journalled within the hollow axle 13 and carries an arm 17 upon the outer end of which is journalled a small sheave 18. A pin 19 is carried upon the outer side of the arm 17 and is placed eccentrically with respect to the shaft 16 and on the opposite side from the arm 17. A lug 20 is pivotally mounted on the pin 19 and has an extension 21 which projects through an opening 22 in the lug 23, the latter extending from the side of the standard 12. A spring 24 surrounds the plunger 21 and presses upwardly upon the lug 20, thereby tending to force the arm 17 about the shaft 16 in a clockwise direction as shown in Fig. 1.

A pin 25 extends from the upper portion of the standard 12 above the spool 14 and rotatably carries an arcuate sheave 26. A lateral extension 27 of the standard 12 carries a hardened metal guide 28 which lies substantially in line with the center of the spool 14 as do also the sheaves 18 and 26.

A flat lever 29 is pivotally mounted on a pin 30 which passes through lugs 31 which are secured to the base 10 and has a notched portion 32 which is adapted to receive a correspondingly notched flat brake-shoe 33 which is formed to fit into the V-shaped notch 34 which is formed at the side of the spool 14. A flat leaf spring 35 normally presses the brake-shoe 33 against the annular V-notch 34.

The operation of the device is as follows:

A spool wound with wire or the like is slid endwise over the axle 13 and a wire keeper or the like 36 is snapped in place to retain the spool thereon. The wire A is then fed up over the sheave 26 down under the sheave 18 and out through the guide 28 to the point where the braiding operation occurs. As the braiding carrier moves back and forth during the braiding operation, it constantly varies its distance from the point where the braiding occurs and, in order to keep the wire A in a substantially uniform tension, the arm 17 constantly moves to accommodate itself to this variation.

As the wire A is fed out during the braiding operation, the lever 17 is gradually drawn upwardly during the outward motion of the carrier on the braiding machine until the upward motion of the lever 17 forces the lower end of the extension 21 against the outer end of the flat lever 29, thereby lowering the brake-shoe 33. When this occurs, the pressure of the spring 24 upon the arm 17 causes the latter to move down drawing with it a certain amount of wire from the spool, at the same time raising the extension 21 and permitting the spring 35 to force the lever 29 upwardly thereby again forcing the brake-shoe 33 into contact with the V-notch 34 and again bringing the spool 14 to a standstill. The arm 17 then continues to move down to the position shown in Fig. 1 and, upon the next outward swing of the carrier, the brake-shoe is again released as has been described.

This arrangement enables the braiding carrier to be made much more compact, particularly bringing as it does the very considerable weight of the spool and the wire wound thereon much nearer the table.

While I have shown and described but a single embodiment of my invention, it is to be understood that it is capable of many modifications. Changes, therefore, may be made which do not depart from the spirit or scope of the appended claims.

I claim:

1. In a braiding carrier, a base, a standard rising therefrom, a laterally projecting arm adapted to receive a spool of wire, a sheave and a guide adjacent the spool, a lever arm adapted to swing about an axis substantially coincident with the axis of the spool, a sheave carried thereby, means for braking said spool including a member having an annular groove operably associated with said spool, a brake shoe operable in said groove, a plunger operable by said lever, a member operably connected to said brake shoe and operable by said plunger to release said braking means.

2. In a braiding carrier, a base, a standard rising therefrom, a laterally projecting arm adapted to receive a spool of wire, a sheave and a guide adjacent the spool, a lever arm adapted to swing about an axis substantially coincident with the axis of the spool, a sheave carried thereby, means for braking said spool including an annular groove operably associated with said spool, a brake shoe, a spring-pressed member normally forcing said shoe toward said groove, a plunger movable by said lever-arm for operating said member to release said brake, and a spring surrounding said plunger for normally retracting said lever arm.

3. In a braiding carrier, a base, a standard rising therefrom, a laterally projecting arm adapted to receive a spool of wire, a sheave and a guide adjacent the spool, a lever arm adapted to swing about an axis substantially coincident with the axis of the spool, a sheave carried thereby, means for braking said spool including an annular groove operably associated with said spool, a brake shoe, a spring-pressed member normally forcing said shoe toward said groove, and means movable by said lever-arm for operating said member to release said brake, said member lying beneath said spool and hinged to swing about a pivot at right angles to the axis of said spool.

4. In a braiding carrier, a base, a standard rising therefrom, a laterally projecting arm adapted to receive a spool of wire, a sheave and a guide adjacent the spool, a lever arm adapted to swing about an axis substantially coincident with the axis of the spool, a sheave carried thereby, means for braking said spool including an annular groove operably associated with said spool, a brake shoe, a spring pressed-member normally forcing said shoe toward said groove, means movable by said lever arm for operating said member to release said brake, said member lying beneath said spool and hinged to swing about a pivot at right angles to the axis of said spool, a flat spring lying beneath said member, and means for adjusting the pressure exerted by said spring on said member.

ARTHUR C. HOPKINS.

CERTIFICATE OF CORRECTION.

Patent No. 1,631,634. Granted June 7, 1927, to

ARTHUR C. HOPKINS.

It is hereby certified that the above numbered patent was erroneously issued to the inventor said "Hopkins", whereas said Letters Patent should have been issued to "National Standard Company", of Niles, Mich., a corporation of Michigan, said Corporation being asignee of the entire interest in said invention, as shown by the records of assignments in this office; and that the said Letters Patent should be read with this correction therein that the same may conform to the record of the case in the Patent Office.

Signed and sealed this 12th day of July, A. D. 1927.

Seal.

M. J. Moore,
Acting Commissioner of Patents.